3,512,248
METHOD OF PRODUCING A THERMOCOUPLE
Arpad Nagy, Hokvogen 4, Bjarred, Sweden, and Rolf Svedman, Mobacksgatan 19, Malmo, Sweden
Filed Dec. 9, 1966, Ser. No. 600,618
Claims priority, application Sweden, Dec. 22, 1965, 16,609/65
Int. Cl. H01v 49/00
U.S. Cl. 29—573                                         3 Claims

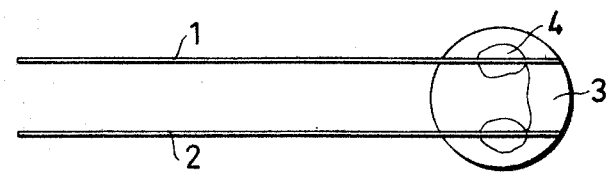
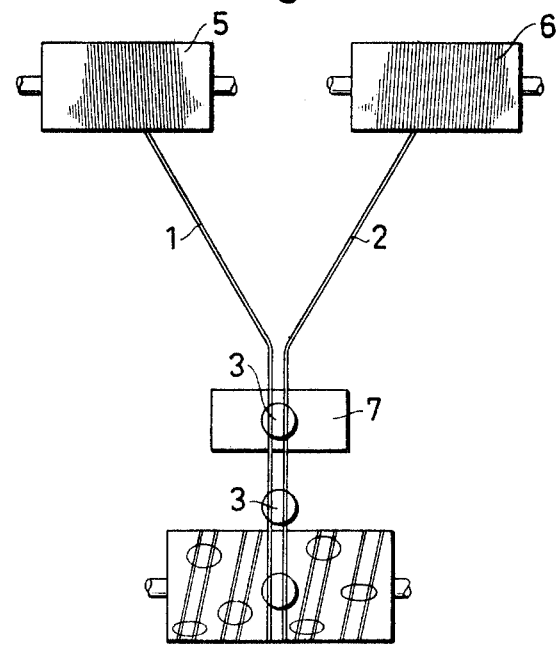
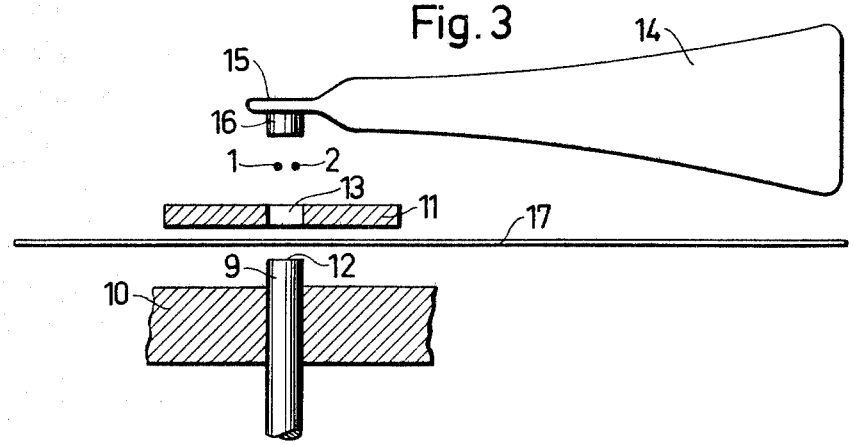

ABSTRACT OF THE DISCLOSURE

A method of producing thermocouples comprises the steps wherein iron and constantan wires are drawn off a supply reel and brought together in parallel spaced relation at a welding station. A thin round of aluminum, stamped from a foil by a stamping tool is brought on the face of the tool into contact with the wires and the wires and round are then welded together ultrasonically, the face of the tool serving as a back-up for the welding. The wires are then fed longitudinally of themselves for a predetermined distance in accordance with the length desired for the thermocouple whereupon the stamping and welding operation are repeated thus forming a string or thermocouples which can thereafter be wound on a storage drum and ultimately cut into individual thermocouple units.

---

The present invention refers to a method of producing thermocouples in a continuous succession, in which the thermocouples may be wound on to a storage reel in an uninterrupted line to be separated individually as required.

As is well-known, thermocouples are used for measuring temperature or temperature differentials, and their physical function is as follows.

If wires of dissimilar materials are connected at two junctions to form a closed circuit and the junctions are held at different temperatures, a thermoelectromotive force is produced between the junctions which drives a current through the circuit. By imparting a known temperature to one of the said junctions between the wires the temperature at the other junction may be determined by measuring the potential difference between the junctions. Since various combinations of materials of the wires result in different potential differences, it is also necessary to know the physical constants of the wires used to be able to determine the temperature at the point of measurement. For one and the same kind of thermocouple it is possible to graduate an electric measuring instrument directly so as to be able immediately to read the temperature difference between the said two junctions.

It is well-known to use thermocouples of the kind contemplated here which consist of two wires of dissimilar materials connected at one end in a soldered joint. These thermocouples are produced individually, i.e. wires of suitable length are joined at their ends by operations carried out separately for each thermocouple.

While this method of production results in satisfactory thermocouples, the production involves increased costs due to the fact that the process includes a plurality of different operations, such as for example detaching wires, mounting said wires at a convenient position for soldering joining by means of soldering and packing the individual thermocouples.

The present invention refers to a continuous simplified method of producing thermocouples and is characterized by the fact that two spaced parallel wires of dissimilar materials are united by positioning metal plates, at a preferably uniform pitch along the extension of the wires, over the said wires and fixing them to the latter by welding or soldering and that the united wires are thereupon cut off or severed adjacent one side of said metal plates to form individual elements, and by the fact that the continuous thermocouples consisting of the wires united by metal plates are wound on to a reel so as to be detached later to form individual units as required.

The invention will be described in the following with reference to the accompanying drawing, in which:

FIG. 1 shows a thermocouple,
FIG. 2 shows a diagram of the course of production,
FIG. 3 shows a device for joining the thermocouple wires.

The thermocouple shown in FIG. 1 consists of two wires 1 and 2 of dissimilar materials and a metal round 3 positioned at the ends of the wires and overlapping both wires, which has been joined to the wires 1 and 2 in a welding zone 4.

The wires may consist, for example, of iron and constantan and the metal round of aluminium.

The size and shape of the metal round 4 may be adjusted according to the purpose for which the thermocouples are intended, i.e. if the thermocouple is to be used for measuring the temperature at a point or within a very limited region, the metal round 4 should be small. If, on the other hand, the temperature throughout a large surface area is to be recorded, the metal round should be of such size that it can cover the major part of this area.

To record rapid temperature changes or record the temperature of small objects the metal round 4 should have as small heat capacity as possible, i.e. as small mass as possible.

In FIG. 2, which shows the sequence of production in making thermocouples according to the invention, two supply reels containing the wires 1 and 2 are designated by 5 and 6.

The wires 1 and 2, which in the present example are supposed to be of iron and constantan, respectively, are disposed substantially parallel in relation to each other and are advanced across a welding device 7.

At the welding device 7 a metal plate in the shape of a round 3 stamped from a foil web, preferably of aluminium, is brought into engagement with the wires 1 and 2, after which the wires and the metal round are joined by welding or soldering. When the metal round 3 has been mounted over the wires 1 and 2 the joined wires are fed forward a small distance while at the same time being rolled on to a reel, whereupon another metal round is positioned over and united with the parts of the wires 1 and 2 which after the feeding movement are located over the welding device. In the way here described on may thus produce a continuous "strip" consisting of the wires 1 and 2 and the metal rounds 3 uniting the wires and spaced from each other. The distance between the metal rounds 3 is of course dependent upon the length of feed of the wires between each welding operation, and the size and shape of the metal rounds may be adjusted by giving the stamping tool which stamps the metal round from a foil web varying shape and size.

FIG. 3 which by way of principle shows a view of a form of the welding device consists of a stamp 9 which is reciprocable in a guide 10. The stamp 9 is arranged to cooperate with a stamping die 11 which has a hole 13 corresponding to the cutting edge 12 of the stamp. Furthermore, the welding device contains a pivot head 14 connected to an ultrasonec generator, the tip 15 of said head and a tool 16 mounted on it being placed straight above the hole 13 in the die 11 in the extension of the movement and direction of the stamp 9.

A web or plate 17 of metal, preferably a web of aluminum foil, is arranged to be advanced between the stamp 9 and the die 11, and the wires 1 and 2 are arranged to be advanced between the hole 13 and the stampling die 11 and the tool 16 of the pivot head 14.

When the stamp 9 is caused to move upwards its leading edge 12 will engage the foil web 17 from which a round is stamped by the stamp 9 cooperating with the stamping die 11. The stamped metal round is moved by the front part of the stamp 9 up towards the wires 1 and 2 in such a way that the metal round will overlap and engage the wires. When the stamped metal round has been placed at the proper position over the wires 1 and 2 the pivot head 14 is caused to vibrate at a high frequency by being coupled to an oscillator not illustrated here.

Upon vibration of the pivot head 14 the wires and the metal round 3 positioned against the wires will be welded together ultrasonically when subjected to the influence of the rapidly oscillating tool. The stamp 9 is adapted to function as a back-up during the welding operation. When the welding operation is terminated the vibrations of the pivot head 14 are caused to cease whereupon the stamp 9 is lowered so far that its leading edge 12 will be situated in a plane under the plane of the foil web 17.

Furthermore, the wires 1 and 2 together with the round 3 joined with the metal round are advanced an arbitrary distance corresponding to one length of thermocouple, and the foil web 17 is advanced between the stamp 9 and the stamping die 11 to make possible the stamping of another metal round 3.

The advantage of the method according to the invention is that the thermocouple may be produced in a continuous sequence and that the finished "thermocouple strip" may be rolled on to a supply reel from which individual thermocouples may be detached as required. Furthermore, the method admits of great flexibility in respect of the design of the thermocouple. Thus, it is very easy by exchanging the stamping tool and stamping die to change the shape and/or the size of the metal round, and it is likewise a simple matter by exchanging the metal web 17 to vary the composition and thickness of the metal round.

Obviously, there is nothing to prevent the utilization of combination of materials other than iron and constantan, as described here, and the dimensions of the wires may easily be changed by exchanging wires.

Finally, in the method according to the invention it is easy to vary the length of the thermocouple by adjusting the advance of the wires to the described length of thermocouple. The method and device according to the invention have proved to very economic, and it was found that the costs of the thermcouple prduction could be reduced substantially without sacrificing the precision of the thermocouples.

We have found that the thermocouples manufactured according to the invention present very similar properties, which is of great value, since it involves much work to search out pairs of similar thermocouples for certain purposes.

Obviously, the invention is not limited to the forms of, for example, welding device and stamping device here illustrated, but it is possible within the scope of the invention, for example, to unite the wires by means of prestamped wires, which in the way illustrated, or by heat working, have been united with the wires.

We claim:

1. A method of producing thermocouples which comprises the steps of arranging a pair of wires of different metals in generally spaced parallel relation such as to enable the wires to be fed in a direction longitudinally thereof, stamping a plate of a third metal from a foil onto the surface of a stamping tool, bringing said tool and hence also said plate in contact with said pair of wires, uniting said wires and plate by welding the wires to the face of said plate, said stamping tool serving as a back-up during the welding operation, feeding the wires and plate a predetermined distance longitudinally in correspondence with the desired length of the thermocouple, repeating the stamping, welding and feeding operation to thereby produce a string of the thermocouples, and severing the wires adjacent the plates to produce individual thermocouple units.

2. The method of producing thermocouples as defined in claim 1 wherein the welding step is performed ultrasonically.

3. The method of producing thermocouples as defined in claim 1 wherein said wires are iron and constantan respectively and said metal plates are constituted by thin rounds of aluminum.

References Cited

UNITED STATES PATENTS

| | | | |
|---|---|---|---|
| 2,953,840 | 9/1960 | Freeburg | 29—25.42 |
| 2,962,058 | 11/1960 | Karnavas et al. | 29—591 X |
| 3,075,386 | 1/1963 | Daly. | |
| 3,092,893 | 6/1963 | Cornelison et al. | 29—591 |
| 3,171,187 | 3/1965 | Ikeda et al. | 29—574 |
| 3,330,026 | 7/1967 | Best et al. | 228—5 X |

JOHN F. CAMPBELL, Primary Examiner

P. M. COHEN, Assistant Examiner

U.S. Cl. X.R.

29—471.1; 136—200, 205; 228—1, 5